US006424987B1

(12) United States Patent
Romain

(10) Patent No.: US 6,424,987 B1
(45) Date of Patent: Jul. 23, 2002

(54) METHOD FOR THE IMPLEMENTATION OF A SPECIFIC MODULAR MULTIPLICATION OPERATION RELATING TO THE MONTGOMERY METHOD

(75) Inventor: Fabrice Romain, Aix en Provence (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/256,334

(22) Filed: Feb. 19, 1999

(30) Foreign Application Priority Data

Feb. 26, 1998 (FR) ............................................. 98 02500

(51) Int. Cl.[7] ................................................ G06F 7/00
(52) U.S. Cl. ....................................................... 708/492
(58) Field of Search ................................. 708/491–492

(56) References Cited

U.S. PATENT DOCUMENTS

| | | | |
|---|---|---|---|
| 4,807,175 A | | 2/1989 | Tokumaru et al. |
| 5,121,431 A | | 6/1992 | Wiener |
| 5,777,916 A | * | 7/1998 | Monier ........................ 708/492 |
| 5,948,051 A | * | 9/1999 | Monier ........................ 708/491 |
| 5,999,953 A | * | 12/1999 | Monier ........................ 708/491 |
| 6,035,317 A | * | 3/2000 | Guy ............................ 708/492 |
| 6,237,015 B1 | * | 5/2001 | Monier ........................ 708/492 |

FOREIGN PATENT DOCUMENTS

| | | | |
|---|---|---|---|
| EP | 0 793 165 A1 | 3/1997 | ............. G06F/7/72 |
| EP | 0 601 716 A1 | 7/1998 | ............. G06F/7/72 |
| EP | 0 853 275 A1 | 7/1998 | ............. G06F/7/52 |

OTHER PUBLICATIONS

B. Arazi, "Double–Precision Modular Multiplication Based on a Single–Precision Modular Multiplier and a Standard CPU," IEEE Journal on Selected Areas in Communications, vol. 11, No. 5, Jun. 1, 1993, pp. 761–769.

* cited by examiner

Primary Examiner—Tan V. Mai
(74) Attorney, Agent, or Firm—Lisa K. Jorgenson; Allen, Dyer, Doppelt, Milbrath & Gilchrist, P.A.

(57) ABSTRACT

The operation $Y_0=(X*J_0) \bmod 2^{Bt}$ is implemented directly within a coprocessor to eliminate the need for, a register of $Bt=m*k$ bits within the coprocessor. This eliminated register enables the storage of a data element during the computation of $Y_0$. The operation $S=A*B \bmod 2^{m*k}$ is implemented with a circuit including at least three registers and a multiplication circuit. One of the registers simultaneously stores S and an intermediate result. To improve the method, a second multiplication circuit and registers of variable sizes are used.

21 Claims, 3 Drawing Sheets

METHOD FOR THE IMPLEMENTATION OF A SPECIFIC MODULAR MULTIPLICATION OPERATION RELATING TO THE MONTGOMERY METHOD

FIELD OF THE INVENTION

The invention relates to the field of microprocessors, and, more particularly, to a modular arithmetic coprocessor.

BACKGROUND OF THE INVENTION

The Montgomery method makes it possible to carry out modular calculations in a finite field (or Galois field) denoted as $GF(2^n)$, without the performance of divisions. Conventionally, modular operations on $GF(2^n)$ are used in cryptography for applications such as authentication of messages, identification of a user, and exchange of cryptographic keys. Exemplary applications are described in the French Patent No. 2,679,054.

There are commercially available integrated circuits dedicated to such applications. These include, for example, the product referenced as ST16CF54, which is manufactured by SGS-THOMSON MICROELECTRONICS. This product is built around a central processing unit and an arithmetic coprocessor, and is dedicated to the performance of modular computations. The coprocessor enables the processing of modular multiplication operations by using the Montgomery method. Further information on this coprocessor can be found in U.S. Pat. No. 5,513,133.

The basic operation, called a $P_{field}$ operation, is implemented by this coprocessor. Three binary data elements A (multiplicand), B (multiplier) and N (modulo) are encoded on a whole number of n bits. This is done for a binary data element denoted as $P_{field}(A, B)_N$ which is encoded on n bits such that $P_{field}(A, B)_N = A*B*I \mod N$. I is a binary data element, called an error, which is encoded on n bits such that $I=2^{-n} \mod N$. More specifically, the value of I depends on the number of k bit blocks considered for the encoding of A, with k being an integer. To perform the operation $A*B*I \mod N$, the data elements are assumed to have been encoded on m words of k bits, with m and k being integers and with $m*k=n$.

In the referenced U.S. Pat. No. 5,313,133, the coprocessor operates with k=32 and m=8 or 16. The coprocessor may be used to produce the result of the modular multiplication $A*B \mod N$. The modular multiplication can be subdivided into two successive elementary Pfield operations. $P_{field}(A, B)_N$, $H)_N$ is computed with H being a data element encoded on n bits, called an error correction parameter, which is equal to $2^{2n} \mod N$. For further details on the implementation of modular multiplication, reference may be made to the above referenced U.S. patent.

The use of the coprocessor disclosed in the referenced U.S. patent enables optimizing in terms of computing duration, memory size, etc., of the processing of modular operations using a fixed data size, e.g., 256 or 512 bits. Cryptography requires machines with increasingly high performance levels, operating at increasingly high speeds and using increasingly complex cryptographic keys. The trend is towards the manipulation of data elements encoded on 768, 1024, 1536 and even 2048 bits. To process data elements of this size, it may be necessary to form larger-sized circuits by adapting the elements of the circuit to the sizes of the data. This approach may raise problems in applications such as chip cards, wherein the size of the circuit is physically limited because of differences in mechanical bending stresses between the cards and the silicon substrates.

Furthermore, it is becoming increasingly necessary to integrate ever larger numbers of different functional elements in a card of this kind. The space available for an encryption circuit is thereby correspondingly reduced. Approaches, therefore, need to be found to limit the increase in the size of this circuit while, at the same time, enabling optimum operation for data elements with a size greater than the size of the initially planned registers.

To carry out modular operations using operands with a size greater than that managed by the coprocessor, it is possible to use the circuit 1 shown in FIG. 1. In practice, the maximum size is equal to the size of the registers. Circuit 1 includes a standard processor 2 (8, 16 or 32 bits), a memory 3, a coprocessor 4 and a communications bus 5 used to connect the different elements 2, 3 and 4 together and/or external to the circuit 1. In circuit 1 of FIG. 1, the coprocessor 4 is used as a multiplier operating on m*k bits, which is conventionally 256 or 512 bits. The processor 2 is used, in particular, to supervise the operations to be performed according to a particular encryption algorithm, and the data exchanges between the memory 3 and the coprocessor 4.

Performance of the basic operation of modular computations according to the Montgomery method, known as the $P_{field}$ operation, is based upon three binary data elements. These binary data elements are A (multiplicand), B (multiplier) and N (modulo), which are encoded on a whole number of n bits. They are used for the production of a binary data element referenced as $P(A, B)_N$, which is encoded on n bits such that $P(A, B)_N = A*B*I \mod N$. I is an error due to the Montgomery method. Should n have a size greater than the size of the registers, namely m*k, it is appropriate to subdivide n into p words of Bt bits. Bt is a working base with a size smaller than or equal to m*k, e.g., m*k. The Montgomery method operates as follows. The variable i is an index varying from 0 to m−1, and the following computation loop is repeated m times:

$X\ S_i + A_i * B$, $Y_0 = (X*J_0) \mod 2^{Bt}$, $Z = X + (N*Y_0)$, $S_{i+1} = Z \backslash 2^{Bt}$, \ is a whole number division, and if $S_{i+1}$ is greater than N, then N is subtracted from $S_{i+1}$, $A_i$ corresponds to a word of Bt bits for the breakdown of A, and $S_i$ corresponds to an updated result of the $P_{field}$ operation, and $S_m = P(A, B)_N = A*B*I \mod N$.

A computation method of this kind requires a large number of data exchanges between the coprocessor 4 and the memory 3, and requires the memory 3 to be sized as a function of the data elements to be stored during intermediate computations. The European Patent 793,165, which corresponds to U.S. patent application having Ser. No. 08/806,456, explains how to perform non-modular multiplication operations and operations of the type $S=A*B+C$ or $S=A*B+C+D$. A, B, C and D are encoded on Bt bits with Bt equal at most to m*k. S is encoded on 2*Bt bits.

If the Montgomery algorithm set up by means of elementary operations of the $S=A*B+C+D$ type is developed, then the following loop repetition is obtained.

A) Computation of $X=S_i + A_i *B$ for providing $X_p \ldots X_0 = S_{i,p-1} \ldots S_{i,0} + A_i * B_{p-1} \ldots B_0$, with $X_j$, $S_{i,j}$ and $B_j$ being the Bt bit words of X, $S_i$ and B. This is a result of the succession of the p computations made in the coprocessor 4.

A1) $X'_1X_0=S_{i,0}+A_i*B_0+0$
A2) $X'_2X_1=S_{i,1}+A_i*B_1+X'_1$
...
Ap-1) $X'_{p-1}X_{p-2}=Si,_p-2+A_i*B_{p-2}+X'_{p-2}$
Ap) $X_pX_{p-1}=S_{i,p-1}+A_i*B_{p-1}+X'_{p-1}$, with $X'_1$ to $X'_{p-1}$ being Bt bit words of intermediate computation that remain permanently in the coprocessor 4.

B) $Y_0=(X*J_0)$ mod $2^{Bt}$, for providing $Y_0=(X_p \ldots X_0*J_0)$ mod $2^{Bt}$ by the following computation made in the coprocessor 4: $Y'_1Y_0=0+X_0*J_0+0$. The least significant word $Y_0$ is the only one of interest.

C) $Z=X+N*Y_0$, for providing $Z_p \ldots Z_0=X_p \ldots X_0+Y_0*N_{p-1} \ldots N_0$. $Z_j$, $X_j$ and $N_j$ are the Bt bit words of Z, X and N using the following succession of p+1 computations made in the coprocessor 4.
C1) $Z'_1Z_0=X_0+Y_0*N_0+0$
C2) $Z'_2Z_1=X_1+Y_0*N_1+Z'_1$
...
Cp-1) $Z'_{p-1}Z_{p-2}=X_{p-2}+Y_0*N_{p-2}+Z'_{p-2}$
Cp) $Z'_pZ_{p-1}=X_{p-1}+Y_0*N_{p-1}+Z'_{p-1}$
Cp+1) $Z_p=X_p+0*0+Z'_p$. $Z'_1$ to $Z'_p$ are Bt bit words of intermediate computation that remain permanently in the coprocessor 4.

D) $S_{i+1}=Z\backslash2^{Bt}$, \ is an integer division. If $S_{i+1}$ is greater than N, then N is subtracted from $S_{i+1}$.

The computation of $Y_0=(X*J_0)$ mod $2^{Bt}$ is done by a non-modular operation which computes $Y'_1Y_0$. The modulo $2^{Bt}$ operation is then performed by abandoning the most significant Bt word $Y'_1$. The implementation of the computation of $Y_0$ amounts to carrying out the unnecessary computation of $Y'_1$.

SUMMARY OF THE INVENTION

An object of the invention is to implement the operation $Y_0=(X*J_0)$ mod $2^{Bt}$ directly within a coprocessor 4 to eliminate the need for a register of Bt=m*k bits within the processor 4. This eliminated register thus enables the storage of a data element during the computation of $Y_0$.

Another object of the invention is to provide a method for implementing a modular operation of the type $S=A*B$ mod $2^{m*k}$. A, B and S are encoded at most on m words of k bits. The integers m and k are greater than 1. A is stored successively by k bit words in a first k bit register, and B is stored in a second m*k bit register. A first multiplication circuit is connected to the first and second registers. The first multiplication circuit performs successive operations of the multiplication of B by each word of A stored in the first register. The word A contained in the first register is changed at each multiplication. In a third m*k bit register, there are stored the k bit words of S obtained successively at the end of each multiplication, and the words of an intermediate result are also stored. The intermediate result corresponds to the least significant words of the result of the multiplication of B by the word A to which a previous intermediate result has been added in a first addition circuit.

Preferably, m successive operations of multiplication are performed with i as an integer index varying from 0 to m–1. $R_i$ is an intermediate result equal to $A_i*B_{m-1-i} \ldots B_0+(R_{i-1}\backslash2^k)$. $A_i$ is the k bit words with the place value i of A. $B_{m-1-i} \ldots B_0$ corresponds to the m–i least significant bits of B. $R_{-1}$ is equal to zero. At the end of the $i^{th}$ multiplication, the third register contains, firstly, the i+1 least significant k bit words of S, and secondly, the m–i least significant words of $R_i$.

First and second embodiments accelerate operation of the method of the invention. In the first embodiment, A is stored successively in k bit words in a fourth k bit register. In a second multiplication circuit connected to the second and fourth registers, successive operations are performed for the multiplication of B by each word of A stored in the fourth register. The word of A contained in the fourth register is changed for each multiplication operation. In a second addition circuit having a delay, the result output from the second multiplication circuit is added with the result output from the first addition circuit before storing in the third register.

In the second embodiment, the size of the second and third registers is made to vary between each new multiplication performed by the first multiplication circuit. Preferably, m/2 successive multiplication operations are performed in each of the first and second multiplication circuits. An integer i varies from 0 to m/2. $R_i$ is an intermediate result equal to $A_{2*i+1}A_{2*i}*B_{m-1-2*i} \ldots B_0+(R)_{i-1}\backslash2^{2*k}$. $A_{2*i}$ and $A_{2*i+1}$ are the k bit words with place values 2*i and 2*i+1 of A. $B_{m-1-2*i} \ldots B_0$ corresponds to the m–2*i least significant words of B. $R_{-1}$ is equal to zero. At the end of the $i^{th}$ multiplication, the third register contains, firstly, the 2*i+2 least significant k bit words of S, and the m–2*i least significant words of $R_i$.

To further limit exchanges with the memory, A is stored beforehand in a fifth m*k shift register. This makes it possible to provide the first register or the fourth register with the k bit words of A to be loaded into the first or fourth registers.

The invention also relates to a modular arithmetic coprocessor comprising a circuit for the implementation of a modular operation of the $S=A*B$ mod $2^{m*k}$ type. A, B and S are encoded on at most m words of k bits, with m and k being integers greater than 1. The implementation circuit includes a first k bit register for storing A successively by k bit words. A second m*k bit register is provided for storing B. A first multiplication circuit is connected to the first and second registers for performing successive operations of multiplication of B by each word of A stored in the first register. The word of A contained in the first register is changed during each multiplication. A third m*k bit register stores the k bit words of S obtained successively at the end of each multiplication. The words of an intermediate result correspond to the least significant words of the result of the multiplication of B by the word of A, wherein a previous intermediate result has been added in a first addition circuit.

The embodiments of the method take the form of the addition of a fourth k bit register to store the k bit words of A successively. A second multiplication circuit is connected to the second and fourth registers for performing successive operations of multiplication of B by each word of A stored in the fourth register. The word of A contained in the fourth register is changed during each multiplication. A second addition register having a delay adds the result output from the second multiplication circuit with the result output from the first addition circuit before storing in the third register. The second and third registers have a variable size, and their size varies during the implementation of a modular operation of the $S=A*B$ mod $2^{m*k}$ type. Furthermore, the implementation circuit may include a fifth m*k bit shift register for enabling the supply to the first or fourth registers of the k bit words of A to be loaded into the first or fourth registers.

More generally, the invention relates to an integrated circuit implementing modular operations according to the Montgomery method that comprises a processor, a memory and a coprocessor of the invention.

BRIEF DESCRIPTION OF THE DRAWINGS

The invention will be understood more clearly and other features and advantages shall appear from the following description, made with reference to the appended drawings, of which.

DETAILED DESCRIPTION OF THE PREFERRED EMBODIMENTS

Figure 1:
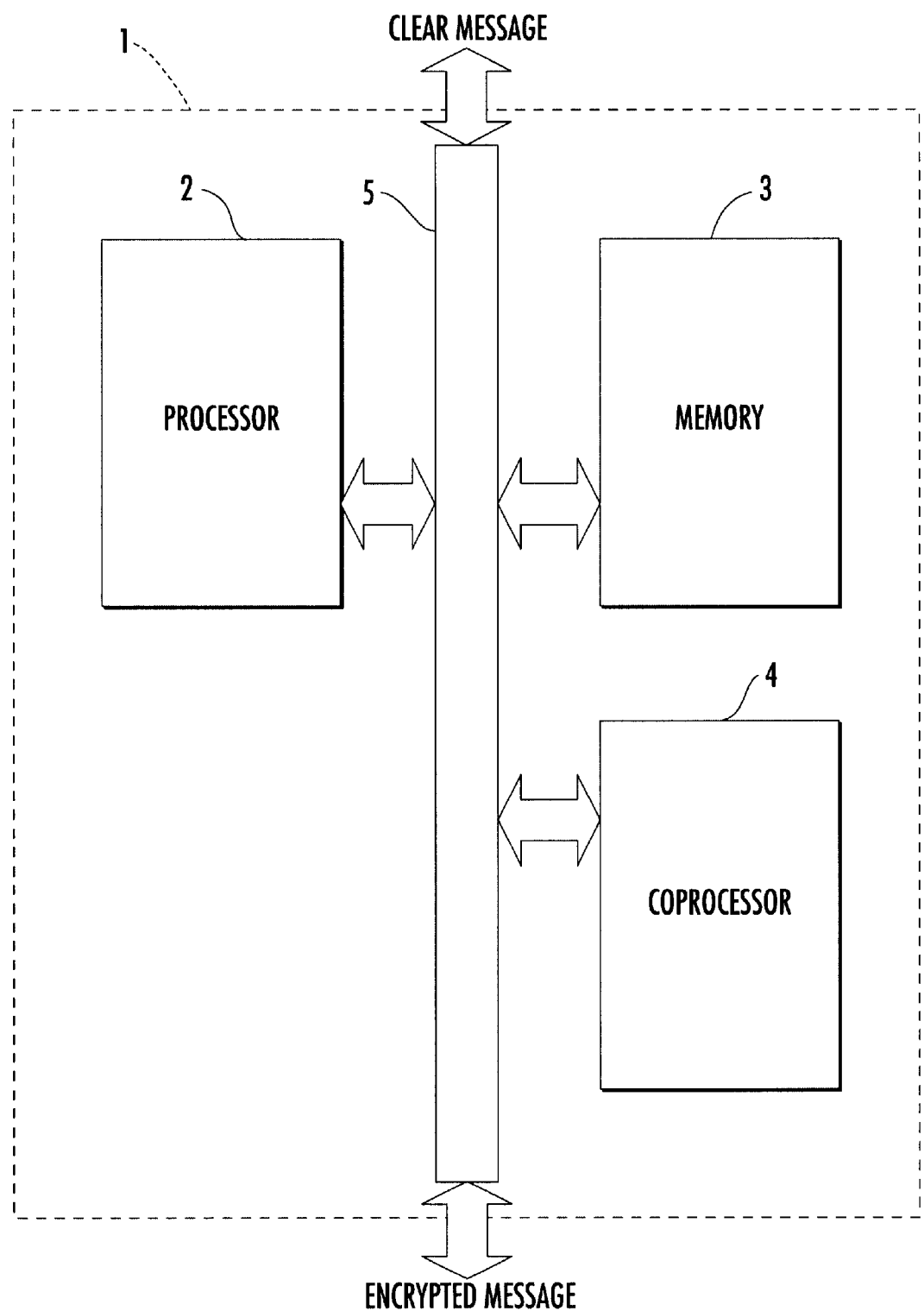
FIG. 1 shows a circuit for performing modular operations on large numbers according to the prior art.
Figure 2:
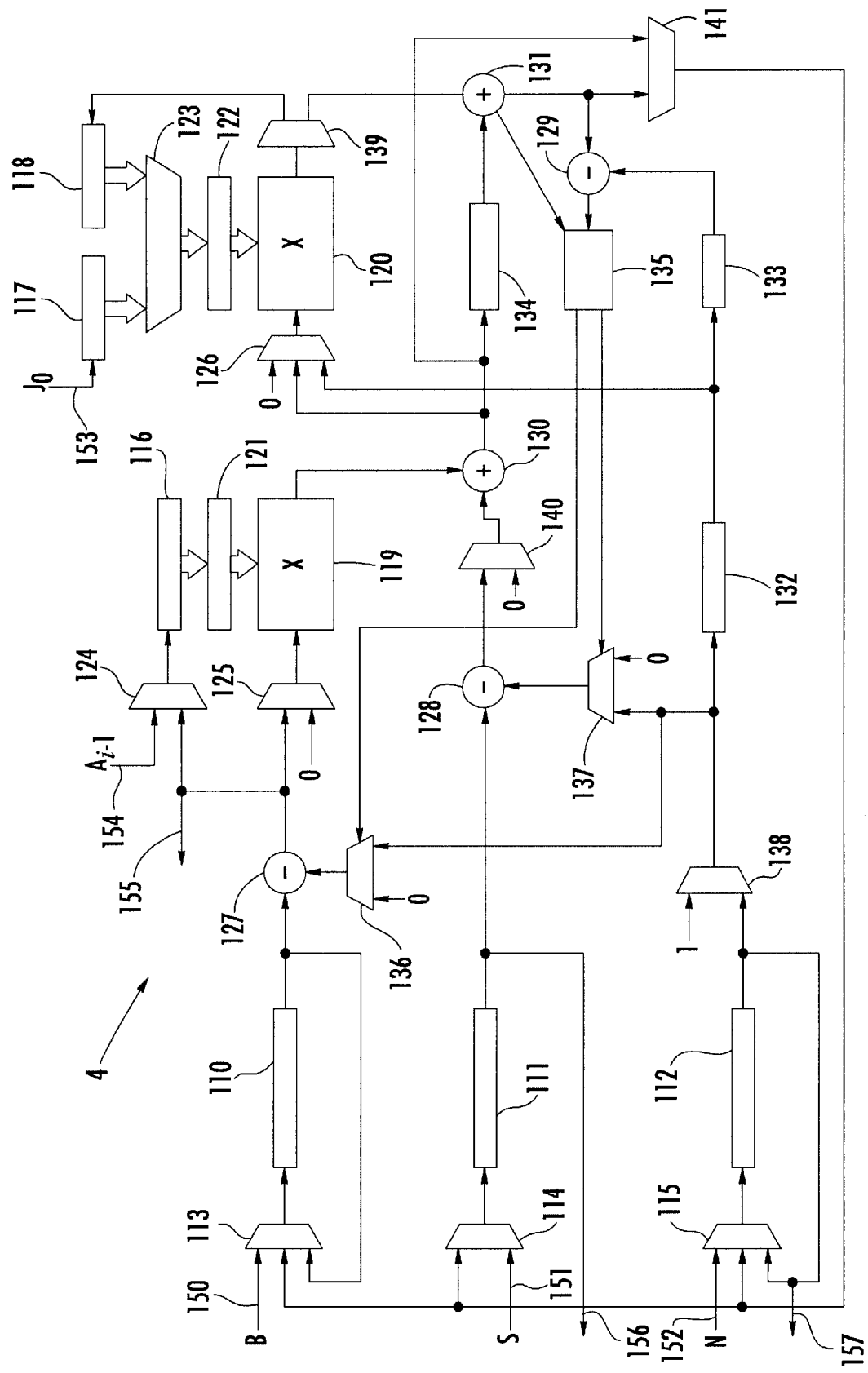
FIGS. 2 and 3 show respective embodiments of a modular arithmetic coprocessor according to the present invention.

FIG. 2 shows a coprocessor 4 for implementing the invention. The coprocessor 4 of FIG. 2 is disclosed in the referenced European Patent No. 793,165. The coprocessor 4 illustrated in FIG. 2 is described in detail in the following paragraphs. The coprocessor 4 comprises three shift registers 110, 111 and 112, each with a series input and a series output. Each register includes a number of n cells, with n=m*k. The variables n, m and k are integers.

A multiplexer 113 comprises three series inputs and one series output. The series output is connected to the input of the register 110. The first input is connected to a first input terminal 150. The second input is connected to the output of the register 110. A multiplexer 114 comprises three series inputs and one series output. The series output is connected to the input of the register 111. The first input is connected to a second input terminal 151. The third input is connected to the output of the register 111. A multiplexer 115 comprises three series inputs and one series output. The series output is connected to the input of the register 112. The first input is connected to a third input terminal 152. The second input is connected to the output of the register 112.

The coprocessor 4 further includes three k-cell registers 116, 117 and 118, each comprising a series input and a parallel output. The input of the register 117 is connected to a fourth input terminal 153. Two multiplication circuits 119 and 120 each comprise a series input, a parallel input to receive k bits, and a series output. Two registers 121 and 122 for the storage of k cells each comprises a parallel input and a parallel output. The input of the register 121 is connected to the output of the register 116. The output of the register 121 is connected to the parallel input of the multiplication circuit 119. The output of the register 122 is connected to the parallel input of the multiplication circuit 120.

A multiplexer 123 comprises two parallel inputs and one parallel output. The first input of the multiplexer 123 is connected to the output of the register 117. The second input of the multiplexer 123 is connected to the output of the register 118. The output of the multiplexer 123 is connected to the input of the register 122. Two multiplexers 124 and 125 each comprises two series inputs and one series output. The output of the multiplexer 124 is connected to the input of the register 116. The first input of the multiplexer 124 is connected to a fifth input terminal 154. The output of the multiplexer 125 is connected to the series input of the multiplication circuit 119, and the first input of the multiplexer 125 receives a logic zero.

A multiplexer 126 comprises three series inputs and one series output. The output is connected to the series input of the multiplication circuit 120, and the first input receives a logic zero. Subtraction circuits 127, 128 and 129 each comprises two series inputs and one series output. The first input of the circuit 127 is connected to the output of the register 110. The output of the circuit 127 is connected to each of the second inputs of the multiplexers 124 and 125, and also to an output terminal 155. The first input of the circuit 128 is connected to the output of the register 111.

An addition circuit 130 comprises two series inputs and one series output. The first input of the circuit 130 is connected to the output of the circuit 119. The output of the circuit 130 is connected to the second input of the multiplexer 126. An addition circuit 131 comprises two series inputs, one series output and one carry output. The carry output of the circuit 131 is connected to the first input of the circuit 129.

Delay cells 132, 133 and 134, which are typically k bit shift registers, delay the propagation of binary data by k cycle times. These cells each comprises one series input and one series output. The output of the cell 132 is connected, firstly, to the third input of the multiplexer 126, and secondly, to the input of the cell 133. The output of the cell 133 is connected to the second input of the circuit 129. The input of the cell 134 is connected to the output of the circuit 130. The output of the cell 134 is connected to the first input of the circuit 131.

A comparison circuit 135 comprises two series inputs and two outputs. The first input is connected to the output of the circuit 131. The second input is connected to the output of the circuit 129. Two multiplexers 136 and 137 each comprises two series inputs, one selection input and one series output. Each of the first inputs receives a logic zero. Each of the selection inputs is connected to one of the outputs of the circuit 135. The output of the multiplexer 136 is connected to the second input of the circuit 127. The output of the multiplexer 137 is connected to the second input of the circuit 128.

A multiplexer 138 comprises two series inputs and one series output. The first input receives a logic one. The second input is connected to the output of the register 112. The output is connected, firstly, to the input of the cell 132, and secondly, to the second inputs of the multiplexers 136 and 137. A demultiplexer 139 comprises one series input and two series outputs. The input is connected to the output of the circuit 120. The outputs are connected respectively to the input of the register 118 and to the second input of the circuit 131.

A multiplexer 140 comprises two series inputs and one series output. The first input is connected to the output of the circuit 128. The second input receives a logic zero. The output is connected to the second input of the circuit 130. A multiplexer 141 comprises two series inputs and one series output. The first input is connected to the output of the circuit 130. The second input is connected to the output of the circuit 131. The output is connected to the third inputs of the multiplexers 113 and 115, and to the second input of the multiplexer 114. Two output terminals 156 and 157 are respectively connected to the outputs of the registers 111 and 112.

To enable the performance of the modular operations and non-modular operations referred to above, those skilled in the art may refer to U.S. Pat. No. 5,313,133, and European Patent No. 793,165. To implement the operation S=A*B mod $2^{Bt}$, the operands A, B and S are manipulated by being divided into m sub-operands of k bits: $A_{m-1} \ldots A_0$, $B_{m-1} \ldots B_0$, $S_{m-1} \ldots S_0$. A, B and S are encoded on Bt bits, with Bt being at most equal to m*k bits. The index 0 designates the least significant word, and the index m−1 designates the most significant word. A and B could have different sizes, but for purposes of simplifying the description, A and B have the same size. The procedure is provided in the following paragraphs.

First initialization: B is loaded into the register 110, and the register 111 is initialized at a logic zero. $A_0$ is loaded into the register 121 by register 116. The multiplexers 136 and 137 are positioned to obtain a logic zero at an output to neutralize the subtraction circuits 127 and 128. The multiplexer 141 is positioned to permanently connect the output of the addition circuit 130 to its output. The addition circuit 130 and the multiplication circuit 119 are initialized.

First iteration: B1) The contents of the registers 110 and 111 are shifted by m*k bits, thus obtaining A. 0*B, and the m*k bit words that result at an output of the addition circuit corresponding to an intermediate result, is referenced as $R_0$, and is stored in the register 111. $R_0$ is capable of being subdivided into m*k bit words of $R_{0,m-1}, R_{0,m-2}, \ldots, R_{0,0}$. The input of the register 110 is looped to its output.

B2) A k bit shift is made in the contents of the register 111 by looping its input to its output to place the word $R_{0,0}$ in the register 111. The word $R_{0,0}$ corresponds to the word in terms of most significant words.

B3) The word A1 is loaded into the register 116 during running of the step B1 and/or B2.

C) Other iterations: repetition of the steps C1 to C5 m−1 times, with i being an index varying from 1 to m−1.

C1) The word Ai is loaded into the register 121. The addition circuit 130 and the multiplication circuit 119 are initialized.

C2) The contents of the registers 110 and 111 are shifted by (m−i)*k bits, thus obtaining $A_i*B_{m-1-i} \ldots B_0 + R_{i-1,m-i} \ldots R_{i-1,1}$. The resulting m−i words of k bits at an output of the addition circuit are stored in the register 111. The resulting m−i words of k bits corresponds to an intermediate result referenced $R_i$. $R_i$ is capable of being subdivided into m−1 words of k bits $R_{i,m-i-1}$ to $R_{i,0}$. The input of the register 110 is looped to its output.

C3) An i*k bit shift is made in the contents of the registers 110 and 111 by looping their inputs respectively to their outputs to place the word $R_{i,0}$ in the register 111. The word B in the register 110 is replaced so that its least significant bit is ready to be provided at an output.

C4) A k bit shift is made in the contents of the register 111 by looping its input to its output to place the word $R_{i,0}$ in the register 111. The word $R_{i,0}$ corresponding to the word $S_i$ is in terms of most significant words. The register 111 contains, at the end of the shift, the i+1 least significant words of S($S_i$ to $S_0$) are stored in the (i+1)*k most significant cells of the register 111.

C5) The word Ai+1 is loaded into the register 116 during running of at least one of the steps C2 to C4, except when i is equal to m−1.

D) It is possible to have $S = A*B \mod 2^{m*k}$, which is contained in the register 111 at the end of the performance of the previous steps.

Should the data elements A and B not have one and the same size, which is a multiple of k, the most significant bit of these data elements is complemented by zeros to obtain two numbers of identical sizes. It is possible to use registers that can be configured as registers with a size of m'*k bits<m*k bits to process words of smaller sizes. Then the same method will be used with registers having a size of m'*k bits, instead of m*k bits by replacing m by m' in the method described above.

The method disclosed herein uses the register 111 to simultaneously store an intermediate result $R_i$ and the i+1 words of the final result S. The word $R_{i,0}$ also corresponds to the word $S_i$. The intermediate result corresponds to the m−i least significant k bit words of the multiplication of B by $A_i$. The method enables the use of the register 112 to store or load another data element during the performance of the operation $S = A*B \mod 2^{m*k}$.

Numerous variants and improvements are possible on the basis of this basic method. Thus, the initialization step A) is not a necessary step if the coprocessor 4 is in a state corresponding to the end of step A) before beginning computation. Similarly, several paths are possible to perform steps B1 and C2, depending on whether it is desired to bypass the delay cell 134. It is also possible to use this method with a coprocessor having four m*k bit registers to store A entirely in the coprocessor 4.

A first improvement consists of the use of the variable-sized m*k bit registers in k bit words to reduce the number of shifts to be performed during each iteration. The use of variable-size registers may, for example, eliminate the steps B2, C3 and C4 in obtaining a variation in the size of the registers during each performance of the step C2. A second improvement uses both multiplication circuits 119 and 120 simultaneously to reduce the computation times.

Figure 3:
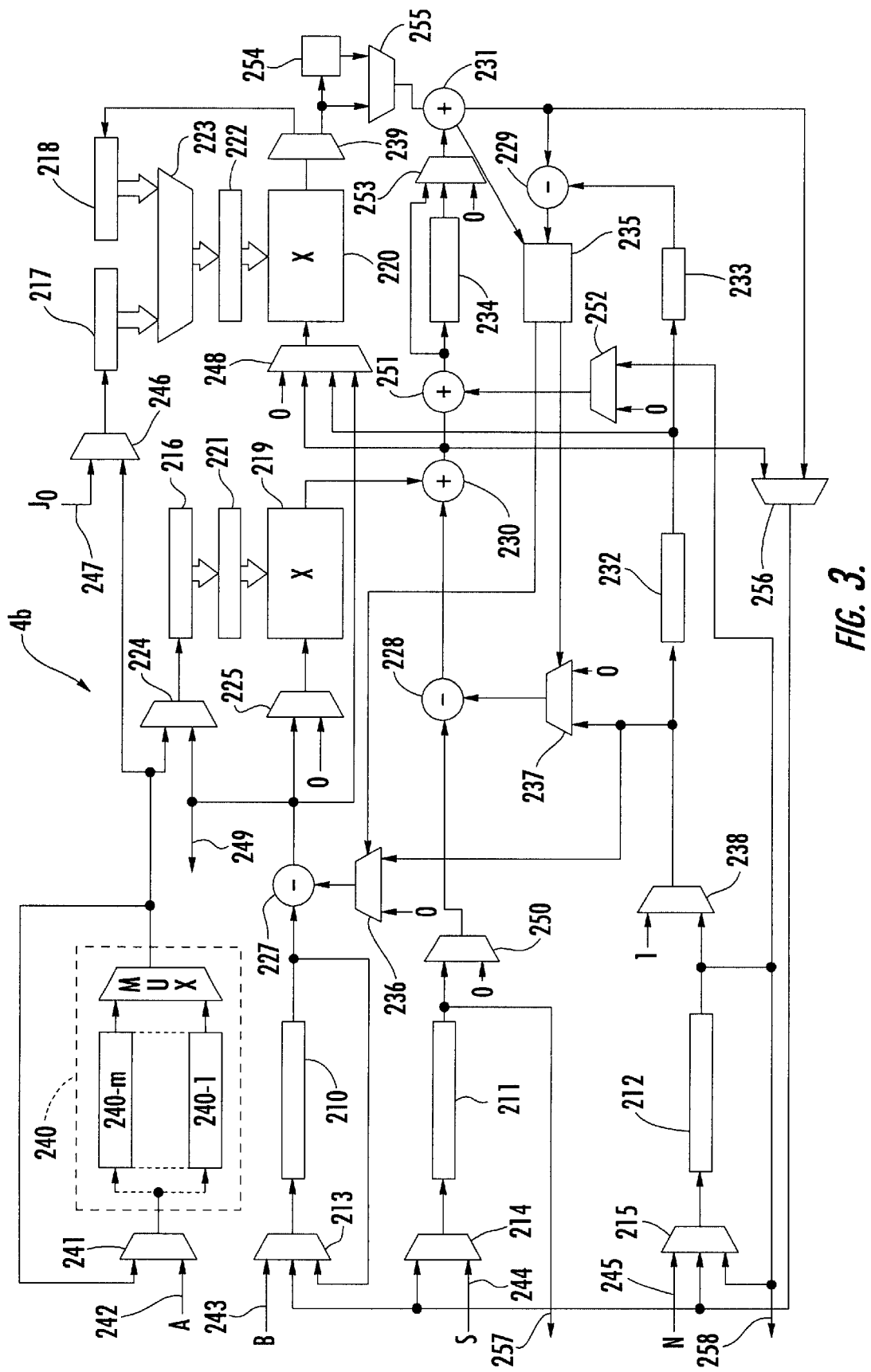

The diagram of FIG. 3 shows a coprocessor according to the invention which makes it possible to obtain the invention with the above-mentioned improvements. However, it is possible to obtain a coprocessor according to the invention that uses only a part of these improvements as a function of the different constraints of computation speed and occupation of silicon surface area, and using the possible compromises resulting from these constraints.

FIG. 3 shows an exemplary coprocessor 4b according to the invention. The device shown in FIG. 3 comprises four shift registers 210, 211, 212 and 240, each with a series input and a series output. These registers each comprises a number of n cells, with n=m*k. The variables n, m and k are integers. A multiplexer 241 comprises two series inputs and one series output. The series output of the multiplexer 241 is connected to the input of the register 240. A first input of the multiplexer 241 is connected to a first terminal 242, and a second input of the multiplexer 241 is connected to the output of the register 240.

A multiplexer 213 comprises three series inputs and one series output. The series output of the multiplexer 213 is connected to the input of the register 210. A first input of the multiplexer 213 is connected to a second input terminal 243. A second input of the multiplexer 213 is connected to the output of the register 210. A multiplexer 214 comprises two series inputs and one series output. The series output of the multiplexer 214 is connected to the input of the register 211. A first input of the multiplexer 214 is connected to a third input terminal 244. A multiplexer 215 comprises three series inputs and one series output. The series output of the multiplexer 215 is connected to the input of the register 212. A first input of the multiplexer 215 is connected to a fourth input terminal 245. A second input of the multiplexer 215 is connected to the output of the register 212.

Three k cell registers 216, 217 and 218 each comprises one series input and one parallel output. A multiplexer 246 comprises two series inputs and one series output. The series output of the multiplexer 246 is connected to the input of the register 217. A first input of the multiplexer 246 is connected to a fifth input terminal 247. A second input of the multiplexer 246 is connected to the output of the register 240. Two multiplication circuits 219 and 220 each comprises one series input, one parallel input to receive k bits and one series output.

Two k cell storage registers 221 and 222 each comprises one parallel input and one parallel output. The input of the register 221 is connected to the output of the register 216. The output of the register 221 is connected to the parallel input of the multiplication circuit 219. The output of the register 222 is connected to the parallel input of the multiplication circuit 220. A multiplexer 223 comprises two parallel inputs and one parallel output. A first input of the multiplexer 223 is connected to the output of the register 217. A second input of the multiplexer 223 is connected to the output of the register 218. The output of the multiplexer 223 is connected to the input of the register 222.

Two multiplexers 224 and 225 each comprises two series inputs and one series output. The output of the multiplexer 224 is connected to the input of the register 216. A first input of the multiplexer 224 is connected to the output of the register 240. The output of the multiplexer 225 is connected to the series input of the multiplication circuit 219. A first input of the multiplexer 225 receives a logic zero. A multiplexer 248 comprises four series inputs and one series output. The output of the multiplexer 248 is connected to the series input of the multiplication circuit 220. A first input of this multiplexer receives a logic zero.

Subtraction circuits 227, 228 and 229 each comprises two series inputs and one series output. A first input of the circuit 227 is connected to the output of the register 210. The output of the circuit 227 is connected to each of the two inputs of the multiplexers 224 and 225, to an output terminal 249, and to a fourth input of the multiplexer 248. A multiplexer 250 comprises three series inputs and one series output. The output of the multiplexer 250 is connected to the first input of the circuit 228. A first input of the multiplexer 250 is connected to the output of the register 211. A second input of this multiplexer receives a logic zero.

Three addition circuits 230, 231 and 251 each comprises two series inputs and one series output. A first input of the circuit 230 is connected to the output of the circuit 219. A second input of this circuit is connected to the output of the subtraction circuit 228. The output of the circuit 230 is connected, firstly, to a second input of the multiplexer 248, and secondly, to a first input of the circuit 251. The output of the circuit 231 is connected to a first input of the circuit 229. A multiplexer 252 comprises two series inputs and one series output. The output of the multiplexer 252 is connected to a second input of the addition circuit 251. A first input of the multiplexer 252 is connected to the output of the addition register 212. A second input of this multiplexer receives a logic zero.

A multiplexer 253 comprises three series inputs and one series output. The series output of the multiplexer 253 is connected to a first input of the addition circuit 231. A first input of this multiplexer is connected to the output of the addition circuit 230. The third input of the multiplexer receives a logic zero. Delay cells 232, 233 and 234 delay propagation of binary data by k cycle periods. These cells are typically k bit shift registers having the same size as registers 216, 217 and 218. These cells each comprise a series input and a series output. The output of the cell 232 is connected, firstly, to a third input of the multiplexer 248, and secondly, to the input of the cell 233. The output of the cell 233 is connected to a second input of the circuit 229. The input of the cell 234 is connected to the output of the addition circuit 251. The output of the cell 234 is connected to a second input of the multiplexer 253.

A comparison circuit 235 comprises two series inputs and two outputs. A first input of the circuit 235 is connected to the output of the circuit 231. A second input of the circuit 235 is connected to the output of the circuit 229. Two multiplexers 236 and 237 each comprises two series inputs, one selection input and one series output. Each of the first series inputs of the multiplexers 236 and 237 receives a logic zero. Each of the selection inputs is connected to one of the outputs of the circuit 235. The output of the multiplexer 236 is connected to a second input of the circuit 227. The output of the multiplexer 237 is connected to a second input of the circuit 228. A multiplexer 238 comprises two series inputs and one series output. A first input of the multiplexer 238 receives a logic one. A second input of the multiplexer 238 is connected to the output of the register 212. The output of the multiplexer 238 is connected, firstly, to the input of the cell 232, and secondly, to second inputs of the multiplexers 236 and 237.

A demultiplexer 239 comprises a series input and two series outputs. The input of the demultiplexer 239 is connected to the output of the circuit 220. A first output of the demultiplexer 239 is connected to the input of the register 218. A delay cell 254 delays propagation of the binary data elements by k cycle times. These cells are typically k bit shift registers. This cell comprises a series input and a series output. The input of the cell 254 is connected to a second output of the demultiplexer 239. A multiplexer 255 comprises two series inputs and one series output. A first input of the multiplexer 255 is connected to the second output of the demultiplexer 239. A second input of the multiplexer 255 is connected to the output of the cell 254. The output of the multiplexer 255 is connected to a second input of the addition circuit 231.

A multiplexer 256 comprises two series inputs and one series output. A first input of the multiplexer 256 is connected to the output of the addition circuit 251, i.e., to the output of the second of the two series-connected addition circuits 230 and 251. A second input of the multiplexer 256 is connected to the output of the addition circuit 231. The output of this multiplexer is connected to the third inputs of the multiplexers 213 and 215, and to a second input of the multiplexer 214. Two output terminals 257 and 258 are connected respectively to the outputs of the registers 211 and 212.

This exemplary coprocessor 4b made according to the invention may undergo modifications without departing from the framework of the invention. With regard to the output and input terminals, it is possible to use distinct terminals. However, these terminals could also be one or more input/output terminals common to several elements of the coprocessor. One advantage of using distinct terminals is that it is possible to receive and/or provide data elements from and/or to elements external to the coprocessor (such as processor 2, for example) in parallel.

Furthermore, with regard to some of the elements of the coprocessor 4b, the above description must also be understood as being a description that is functional rather than structural. In other words, the multiplexers could be grouped with each other and have a greater number of inputs, outputs and selection inputs. With regard to the multiplexers 225, 236, 237, 240, 250, 252 and 253, which have an input receiving a fixed signal, i.e., a logic zero or one, it is possible to incorporate them functionally with the circuits 219, 227, 228, 230 and 251 if these circuits include a control input enabling a logic state to be imposed on one of their inputs.

The register 240 enables the storage in the coprocessor of an n bit operand A. This makes it possible to limit the exchanges between the coprocessor and external to the coprocessor, and therefore to obtain a gain in time. The multiplexer 246 enables the loading of the register 217 with bits provided by the register 240. This makes it possible to make parallel use of the addition circuits 219 and 220 without requiring successive operations to load the registers 216 and 217 with words provided to the coprocessor.

It is possible, if necessary, to do without the register 240 and the multiplexer 246 and achieve the parallel loading external to the coprocessor of the k bit words to implement a parallel operation of the multiplication circuits 219 and 220. The multiplexer 241 makes it possible, by looping the output of the register 240 to its input, to keep the contents of this register permanently intact when words are provided by shifting at an output of this register. It is possible to insert the multiplexer 250 between the output of the subtraction circuit 228 and the first input of the addition circuit 230 while at the same time preserving an analog function.

The fourth input of the multiplexer 248 may be directly connected to the output of the register 210. This is equivalent from the functional viewpoint of connecting it to the output of the subtraction circuit 227 if the subtraction circuit 227 receives a logic zero permanently at its second input. The addition circuit 251 and the multiplexer 252 enable the implementation of the A*B+C+D type operations. The data elements C and D are given by the registers 211 and 212. The addition circuit 251 becomes transparent when the multiplexer 252 is positioned to provide the logic zero permanently at its output.

It is possible to place the addition circuit 251 between the output of the multiplication circuit 219 and the first input of the addition circuit 230, and connect the first input of the multiplexer 256 to the output of the addition circuit 230. It is also possible to place the addition circuit 251 between the output of the register 211 and the second input of the addition circuit 230. In the same way as above, the first input of the multiplexer 256 is then connected to the output of the addition circuit 230. It is also possible to place the addition circuit 251 between the output of the multiplexer 253 and the first input of the addition circuit 231. It is also possible to place the addition circuit 251 down line with respect to the addition circuit 231.

The multiplexer 253 enables the output of the addition circuit 251 to be connected directly to the first input of the addition circuit 231 without delaying the transfer of data between these circuits through the delay cell 234. It also enables the application of logic zeros to the addition circuit 231. It is possible, if necessary, to use a two-input multiplexer and not bypass the delay cell 234. However, this would be a disadvantage to the computation time because this delay cell 234 is systematically crossed. It is also possible during operations to functionally replace the third input of the multiplexer 253 by a selection of the first inputs of the multiplexers 225 and 237, and of the second inputs of the multiplexers 250 and 252 so that the first input of the multiplexer 253 receives logic zeros.

The delay cell 254 delays the flow of bits produced by the multiplication circuit 220 by k cycle periods. It is thus possible to add up the bits produced by the multiplication circuits 219 and 220 without taking account of the k first bits given by the multiplication circuit 219 during an operation. If the delay cell 234 is not bypassed by the multiplexer 253, it is necessary to modify the cell 254 to obtain a delay of 2*k cycle periods. The multiplexer 256 enables the storage in one of the registers 210 to 212 of the bits produced by the addition circuit 230. The multiplexer 256 can also be eliminated provided that the addition circuit 231 is neutralized by sending logic zeros to its second input through the multiplexer 255 and the multiplication circuit 248.

Furthermore, it is preferred to use, as shift registers 210, 211, 212 and 240, variable-sized registers arranged in banks of registers, as shown in FIG. 3 for the register 240. The register 240 is formed by m sub-registers 240-1 to 240-m, which are k bit shift registers. Each register has a series input and a series output. The inputs are connected together to form the input of the register 240. A multiplexer MUX having m series inputs and one series output has each of its inputs respectively connected to each output of the sub-registers 240-1 to 240-m. To simplify the drawing, the registers 210, 211 and 212 have been shown in a single block although they are of the same structure as the register 240, i.e., they are each divided into m respective sub-registers 210-1 to 210-m, 211-1 to 211-m, 212-1 to 212-m.

When it is desired to bring out an m*k word, for example, from the register 211, it is sufficient to output a first k bit word from the sub-register 211-1 and then a second k bit word from the sub-register 211-2 and so on, up to the $m^{th}$ k bit word of the 211-m sub-register. To register an m*k bit word, a first k bit word is stored in the sub-register 211-1. Then a second k bit word is stored in the sub-register 211-2 and so on, up to the $m^{th}$ k bit word in the sub-register 211-m. It is possible to consider storing the words in a different order. It is also possible to address only one of the sub-registers 211-1 to 211-m independently.

If, by contrast, the operation is done with words having a size of m'*k bits with m'<m, either a part of the sub-registers is used in a fixed manner, or else all the registers are used randomly. For example, the sub-registers include 211-1 to 211-m' or 211-j to 211-m with j=1+m-m'. The use of a bank of registers furthermore makes it possible to have at most 2*k register cells that work simultaneously. This provides an output divided by m/2 when the operation is done with m*k bit words.

To implement the operation S=A*B mod $2^{Bt}$ with the coprocessor 4b, the operands A, B and S are manipulated by being divided into m sub-operands of k bits: $A_{m-1} \ldots A_0$, $B_{m-1} \ldots B_0$, $S_{m-1} \ldots S_0$. A, B and S are encoded on Bt bits, with Bt being at most equal to m*k bits. The index 0 designates the least significant word, and the index m–1 designates the most significant word. For simplification, A and B have the same size and m is an even number. However, A and B could have different sizes. The procedure is as follows.

A') First initialization: A is loaded into the register 240. $A_0$ is, for example, in the sub-register 240-1 and Am–1 is, for example, in the sub-register 240-m. B is loaded into the register 210. $B_0$ is, for example, in the sub-register 210-1 and $B_{m-1}$ is, for example, in the sub-register 210-m. The register 211, i.e., all the sub-registers 211-1 to 211-m are initialized at a logic zero. $A_0$ is loaded into the register 221 by the register 216. A1 is loaded into the register 222 by the register 217. The multiplexers 236, 237 and 252 are positioned to provide a logic zero at an output to neutralize the subtraction circuits 227 and 228 and the addition circuit 251. The multiplexer 253 is positioned to permanently connect at its output the output of the addition circuit 251. The addition circuits 230 and 231, and the multiplication circuits 219 and 220, and the delay cell 254 are initialized.

First iteration: B'1) k bit shifts are carried out successively with the contents of the sub-registers 210-1 to 210-m to obtain $A_0$*B in the multiplication circuit 219 and to obtain A1*B in the multiplication circuit 220. During the shifts, the bits output from the multiplication circuit 219 are added up in the addition circuit 231 with the bits output from the multiplication circuit 220. These bits have been delayed by k clock cycles to obtain, at an output of the addition circuit 231 $A_1A_0$*B. The first m words of k bits output from the addition circuit 231 corresponds to an intermediate result referenced $R_0$, which is stored in the register 211. $R_0$ is capable of being subdivided into m words of k bits $R_{0,m-1}$, $R_{0,m-2}, \ldots, R_{0,0}$. Each word of $R_0$ is stored in one of the m sub-registers 211-1 to 211-m. The word $R_{0,0}$ corresponds to the word $S_0$ being placed in the sub-register 211-1. The word $R_{0,1}$ corresponds to the word $S_1$ being placed in the sub-register 211-2. The input of the register 210 is looped to its output to keep B in the register 210.

B'2) Using the register 240, the word $A_2$ is loaded into the register 216, and the word $A_3$ is loaded into the register 217 during running of the step B'1.

Other iterations: Repetition of the steps C'1 to C'3 (m/2)−1 times, with i being an index varying from 1 to (m/2)−1. C'1) The word $A_{2*i}$ is loaded into the register 221, and the word $A_{2*i+1}$ is loaded into the register 222. The addition circuits 230 and 231 and the multiplication circuits 219 and 220 are initialized.

C'2) k bit shifts are carried out successively in the contents of the sub-registers 210-1 to 210-j to obtain $A_{2*i}*B_{m-1-2*i} \ldots B_0$ in the multiplication circuit 219 and to obtain $A_{2*i-1}*B_{m-1-2*i} \ldots B_0$ in the multiplication circuit 220. The variable j is an integer equal to m−2*i. Simultaneously, k bit shifts are performed successively in the contents of the sub-registers 211-h to 211-m for the addition in the addition circuit 230 of $R_{i-1,m-2*i+1} \ldots R_{i-1,2}$ with the result output from the multiplication circuit 219. The variable h is an integer equal to 2*i+1. In the addition circuit 231, the bits output from the addition circuit 230 are added with the bits output from the multiplication circuit 220 that have been delayed by k clock cycles to obtain, at an output of the addition circuit 231, $A_{2*i+1}A_{2*i}*B_{m-1-2*i} \ldots B_0+R_{i-1,m-2*i+1} \ldots R_{i-1,2}$. The m−2*i first k bit words output from the addition circuit 231, which correspond to an intermediate result referenced as $R_i$, are stored in the register 211. $R_i$ is capable of being subdivided into m−2*i words of k bits, $R_{i,m-2*i+1}, \ldots, R_{i,0}$. Each word of $R_i$ is stored in one of the m−2*i sub-registers 211-h to 211-m. The word $R_{i,0}$ corresponds to the word $S_{2*i}$ being placed in the sub-register 211-h. The word $R_{i,1}$ corresponds to the word $S_{2*i+1}$ being placed in the sub-register 211-(h+1). The input of the register 210 is looped to its output to keep B in the register 210.

C'3) From the register 240, the word $A_{2*i+2}$ is loaded into the register 216, and the word $A_{2*i+3}$ is loaded into the register 217 during the running of the step C'2, except when i is equal to (m/2)−1.

D') It is possible to have $S=A*B \mod 2^{m*k}$, which is contained in the register 211 at the end of the performance of the preceding steps.

Should the data elements A and B not have one and the same size that is a multiple of k, the most significant bits of these data elements are complemented by logic zeros to obtain two identically sized numbers. It is possible to use only a part of the registers 240, 210 and 211 when A and B have a size of m'*k bits<m*k bits to process words of smaller size. Then the same method will be used with registers having a size of m'*k bits instead of m*k bits by replacing m by m' in the method described above. When the number of words of A and B is an odd number, it is possible to return to a case where the numbers of words is an even number by the addition of a logic zero in significant bits.

If on the contrary, the operation is done with an odd number of sub-registers m, the step C' is performed by making i vary from 1 to (m−1)/2+1 and adding the step C''2 just before the step D'. The step C''2) involves a k bit shift in the contents of the sub-register 210-1 to obtain $A_{m-1}*B_0$ in the multiplication circuit 219. Simultaneously, a k bit shift is made in the contents of the sub-register 211-m for the addition in the addition circuit 230 of $R_{(m-1)/2-1,2}$ with the result output from the multiplication circuit 219 to obtain $A_{m-1}*B_0+R_{(m-1)/2-1,2}$. The first k bit word output from the addition circuit 230 corresponding to $S_{m-1}$ is stored in the sub-register 211-m.

The use of two multiplication circuits 219 and 220 enables the number of iterations to be halved as compared with the circuit of FIG. 2. The variable-size registers used enable a reduction in the duration of each iteration as a function of the number of k bit words of S obtained during each iteration of the method. To obtain the effect, it is sufficient for the registers 210 and 211 to be variable-size registers. The register 240 enables the storage of A as an integer to eliminate the exchanges between the memory 3 and the coprocessor 4 during the running of the computation. Furthermore, the data contained in the register 240 may be used again if the register has been looped to itself. The use of the register 240 is partially compensated for in terms of surface area inasmuch as it enables a reduction in the size of the memory 3.

As explained above, the improvements may be used independently without departing from the framework of the invention. Similarly, many structural modifications are possible without changing the functional character of the coprocessor, and therefore, without departing from the framework of the invention.

What is claimed is:

1. A method for implementing a modular operation of $S=A*B \mod 2^{m*k}$, with A, B and S being encoded on at most m words of k bits, and with m and k being integers greater than 1, the method comprising the steps of:

successively storing A using k bit words in a first k bit register;

storing B in a second m*k bit register;

successively multiplying B by each word of A stored in the first register using a first multiplication circuit connected to the first and second registers, each word of A stored in the first register being changed for each multiplication;

storing in a third m*k bit register words of an intermediate result corresponding to least significant words of a result of the multiplication of B by a word of A in which a previous intermediate result has been added in a first addition circuit; and storing in the third m*k bit register the k bit words of S obtained successively at an end of each multiplication.

2. A method according to claim 1, wherein the step of successively multiplying comprises performing m successive operations of multiplying, with i being an integer index varying from 0 to m−1, with $R_i$ being an intermediate result equal to $A_i*B_{m-1-i} \ldots B_0+(R_{i-1}\backslash 2^k)$, wherein $A_i$ is a k bit word having a place value i of A, $B_{m-1-i} \ldots B_0$ corresponds to m−i least significant bits of B, $R_{-1}$ is equal to zero, and at an end of an $i^{th}$ multiplication the third register contains, firstly, i+1 least significant k bit words of S and, secondly, m−i least significant words of $R_i$.

3. A method according to claim 1, further comprising the steps of:

successively storing A using k bit words in a fourth k bit register;

successively multiplying B by each word of A stored in the fourth register using a second multiplication circuit connected to the second and fourth registers, each word of A stored in the fourth register being changed during each multiplication; and adding a result output from the second multiplication circuit with a result provided at an output from the first addition circuit before storing in the third register.

4. A method according to claim 3, further comprising the steps of performing m/2 successive multiplication operations in each of the first and second multiplication circuits, with i being an integer index varying from 0 to m/2, $R_i$ being an intermediate result equal to $A_{2*i+1}A_{2*i}*B_{m-1-2*i} \cdots B_0+(R_{i-1}\backslash 2^{2*k})$, with $A_{2*i}$ and $A_{2*i+1}$ being the k bit words with place values 2*i and 2*i+1 of A, $B_{m-1-2*i} \cdots B_0$ corresponds to 2*i least significant words of B, $R_{-1}$ being equal to zero and wherein, at an end of an $i^{th}$ multiplication, the third register contains, firstly, 2*i+2 least significant k bit words of S, and secondly, m−2*i least significant words of $R_i$.

5. A method according to claim 1, further comprising the step of storing A in a fifth m*k shift register prior to storing the k bit words of A into the first or fourth registers.

6. A method according to claim 1, wherein a size of the second and third registers varies between each new multiplication performed by the first multiplication circuit.

7. A method for implementing a modular operation of S=A*B mod $2^{m*k}$, with A, B and S being encoded on at most m words of k bits, and with m and k being integers greater than 1, the method comprising the steps of:

successively storing A using k bit words in a first k bit register;

storing B in a second m*k bit register;

successively multiplying B by each word of A stored in the first register using a first multiplication circuit connected to the first and second registers, each word of A stored in the first register being changed for each multiplication;

storing in a third m*k bit register words of an intermediate result corresponding to least significant words of a result of the multiplication of B by a word of A in which a previous intermediate result has been added in a first addition circuit;

storing in the third m*k bit register the k bit words of S obtained successively at an end of each multiplication; and a size of the second and third registers varies between each new multiplication performed by the first multiplication circuit.

8. A method according to claim 7, wherein the step of successively multiplying comprises performing m successive operations of multiplying, with i being an integer index varying from 0 to m−1, with $R_i$ being an intermediate result equal to $A_i*B_{m-1-i} \cdots B_0+(R_{i-1}\backslash 2^k)$, wherein $A_i$ is a k bit word having a place value i of A, $B_{m-1-i} \cdots B_0$ corresponds to m−i least significant bits of B, $R_{-1}$ is equal to zero, and at an end of an $i^{th}$ multiplication the third register contains, firstly, i+1 least significant k bit words of S and, secondly, m−i least significant words of $R_i$.

9. A method according to claim 7, further comprising the steps of:

successively storing A using k bit words in a fourth k bit register;

successively multiplying B by each word of A stored in the fourth register using a second multiplication circuit connected to the second and fourth registers, each word of A stored in the fourth register being changed during each multiplication; and adding a result output from the second multiplication circuit with a result provided at an output from the first addition circuit before storing in the third register.

10. A method according to claim 9, further comprising the steps of performing m/2 successive multiplication operations in each of the first and second multiplication circuits, with i being an integer index varying from 0 to m/2, $R_i$ being an intermediate result equal to $A_{2*i+1}A_{2*i}*B_{m-1-2*i} \cdots B_0+(R_{i-1}\backslash 2^{2*k})$, with $A_{2*i}$ and $A_{2*i+1}$ being the k bit words with place values 2*i and 2*i+1 of A, $B_{m-1-2*i} \cdots B_0$ corresponds to 2*i least significant words of B, $R_{-1}$ being equal to zero and wherein, at an end of an $i^{th}$ multiplication, the third register contains, firstly, 2*i+2 least significant k bit words of S, and secondly, m−2*i least significant words of $R_i$.

11. A method according to claim 7, further comprising the step of storing A in a fifth m*k shift register prior to storing the k bit words of A into the first or fourth registers.

12. A modular arithmetic coprocessor comprising:

a circuit for implementing a modular operation of S=A*B mod $2^{m*k}$, with A, B and S being encoded on at most m words of k bits, with m and k being integers greater than 1, said circuit comprising a first k-bit register for successively storing A using k bit words, a second m*k-bit register for storing B, a first multiplication circuit connected to said first and second registers for successively multiplying B by each word of A stored in said first register, means for changing each word of A stored in said first register during each multiplication, a first addition circuit, and a third m*k bit register for storing k bit words of S obtained successively at an end of each multiplication and for storing words of an intermediate result corresponding to least significant words of a result of the multiplication of B by each word of A in which a previous intermediate result has been added in said first addition circuit.

13. A modular arithmetic coprocessor according to claim 12, wherein said circuit further comprising:

a fourth k bit register for successively storing k bit words of A;

a second multiplication circuit connected to said second and fourth registers for successively multiplying B by each word of A stored in said fourth register;

means for changing each word of A stored in said fourth register during each multiplication; and a second addition circuit for adding with a delay a result provided at an output from said second multiplication circuit with a result provided at an output from said first addition circuit before storing in said third register.

14. A modular arithmetic coprocessor according to claim 12, wherein said second and third registers have a variable size that varies during implementation of a modular operation of S=A*B mod $2^{m*k}$.

15. A modular arithmetic coprocessor according to claim 12, further comprising a fifth m*k bit shift register for storing A prior to storing the k bit words of A into the first or fourth registers.

16. A modular arithmetic coprocessor according to claim 12, wherein said circuit is connected to a processor and a memory.

17. A computer comprising:

a processor;

a memory connected to said processor; and a coprocessor connected to said processor, said coprocessor for implementing a modular operation of S=A*B mod $2^{m*k}$, with A, B and S being encoded on at most m words of k bits, with m and k being integers greater than 1, said coprocessor comprising a first k-bit register for successively storing A using k bit words, a second m*k-bit register for storing B, a first multiplication circuit connected to said first and second registers for successively multiplying B by each word of A stored in said first register, means for changing each word of A stored in said first register during each multiplication, a first addition circuit, and a third m*k bit register for storing k bit words of S obtained successively at an end of each multiplication and for storing words of an intermediate result corresponding to least significant words of a result of the multiplication of B by each word of A in which a previous intermediate result has been added in said first addition circuit.

18. A computer according to claim 17, wherein said coprocessor further comprising:

a fourth k bit register for successively storing k bit words of A;

a second multiplication circuit connected to said second and fourth registers for successively multiplying B by each word of A stored in said fourth register;

means for changing each word of A stored in said fourth register during each multiplication; and a second addition circuit for adding with a delay a result provided at an output from said second multiplication circuit with a result provided at an output from said first addition circuit before storing in said third register.

19. A computer according to claim 17, wherein said second and third registers have a variable size that varies during implementation of a modular operation of $S=A*B \bmod 2^{m*k}$.

20. A computer according to claim 17, wherein said coprocessor further comprising a fifth m*k bit shift register for storing A prior to storing the k bit words of A into the first or fourth registers.

21. A computer according to claim 17, wherein said coprocessor is a modular arithmetic coprocessor.

* * * * *